United States Patent
Jiang et al.

(10) Patent No.: US 10,915,075 B2
(45) Date of Patent: Feb. 9, 2021

(54) RECONFIGURABLE HARDWARE-ACCELERATED MODEL PREDICTIVE CONTROLLER

(71) Applicant: University of Dayton, Dayton, OH (US)

(72) Inventors: Zhenhua Jiang, Dayton, OH (US); Seyed Ataollah Raziei, Dayton, OH (US)

(73) Assignee: UNIVERSITY OF DAYTON, Dayton, OH (US)

( * ) Notice: Subject to any disclaimer, the term of this patent is extended or adjusted under 35 U.S.C. 154(b) by 113 days.

(21) Appl. No.: 16/149,289

(22) Filed: Oct. 2, 2018

(65) Prior Publication Data
US 2019/0101877 A1   Apr. 4, 2019

Related U.S. Application Data

(60) Provisional application No. 62/566,697, filed on Oct. 2, 2017.

(51) Int. Cl.
G05B 13/04   (2006.01)
(52) U.S. Cl.
CPC .................. *G05B 13/048* (2013.01)
(58) Field of Classification Search
CPC .................................................. G05B 13/048
See application file for complete search history.

(56) References Cited

U.S. PATENT DOCUMENTS

| | | | | |
|---|---|---|---|---|
| 5,490,278 | A | * 2/1996 | Mochizuki | ............. G06F 17/12 708/446 |
| 6,907,513 | B2 | * 6/2005 | Nakanishi | ............... G06F 17/12 708/520 |

* cited by examiner

*Primary Examiner* — Mark A Connolly
(74) *Attorney, Agent, or Firm* — Thomas E. Lees, LLC (57) ABSTRACT

A device for controlling an industrial system comprises an input block and a reference value predicter. The reference value predicter includes a disturbance predicter, a state predicter, and a model parameter predicter. A model updater updates the model of the industrial system based on the predicted state and the predicted parameters. A one-prediction-step calculator of the reference value predicter calculates a prediction step based on the predicted disturbances and the model of the system. The device further includes a matrix updater and a linear solver that includes a memory structure such that each row of Jacobian and gradient matrices may be processed in parallel, a pivot search block that determines a maximum element in a column of the Jacobian and gradient matrices, and a pivot row reading block. Moreover, the device further includes a solution updater that updates the solution for an iteration step and controls the iteration process and an output block that sends a solution to the industrial system.

8 Claims, 12 Drawing Sheets

RECONFIGURABLE HARDWARE-ACCELERATED MODEL PREDICTIVE CONTROLLER

CROSS REFERENCE TO RELATED APPLICATIONS

This application claims the benefit of U.S. Provisional Patent Application Ser. No. 62/566,697, filed Oct. 2, 2017, entitled RECONFIGURABLE HARDWARE-ACCELERATED MODEL PREDICTIVE CONTROLLER, the disclosure of which is hereby incorporated by reference.

BACKGROUND

Various aspects of the present disclosure relate generally to a reconfigurable hardware-accelerated model predictive controller using a real-time computational solver to find an optimal control action for a nonlinear dynamic system. Thus, aspects of the present disclosure are directed toward an improvement in control systems in terms of both computing speed and control performances.

Many industrial systems are multi-input multi-output (MIMO) dynamic systems. Typically, these systems are also nonlinear systems with active limits or rate constraints on controlled variables (output) and manipulated variables (control input). In addition, there are frequently multiple control objectives in these systems which need to be satisfied and coordinated to achieve desirable system performances.

BRIEF SUMMARY

According to aspects of the present disclosure, a device for controlling an industrial system comprises an input block and a reference value predicter. The device further includes a matrix updater that updates each entry of these two matrices by accumulating the respective calculations over all of the Np prediction steps and a linear solver that includes a memory structure such that each row of Jacobian and gradient matrices may be processed in parallel, a pivot search block that determines a maximum element in a column of the Jacobian matrix, and a pivot row reading block. Moreover, the device further includes a solution updater that updates the solution for an iteration step and controls the Newton's iteration process, and an output block that sends a control solution to the industrial system.

According to aspects of the present disclosure, the reference value predicter of the device includes a disturbance predicter that predicts disturbances in the industrial system and a state predicter that predicts a state of the industrial system. Further, the reference value predicter includes model parameter predicter that predicts parameters for a model of the industrial system, and a model updater that updates the model of the industrial system based on the predicted state and the predicted parameters. A one-prediction-step calculator of the reference value predicter calculates the entries to the Jacobian and gradient matrices over one prediction step based on the predicted disturbances and the model of the industrial system. This one-prediction-step calculator is repeated for Np steps where Np is defined as the prediction horizon.

According to further aspects of the present disclosure, a linear solver comprises a memory structure such that each row of Jacobian and gradient matrices may be processed in parallel and a pivot search block that determines a maximum element in a column of the Jacobian matrix. The pivot search block includes two engines such that two pivot search determinations are processed in parallel before reducing to one determination. Further, the linear solver includes a pivot row reading block and a submatrix update block that performs a Gauss-Jordan elimination procedure. The pivot search block, the pivot row reading block, and the submatrix update block process in parallel.

According to further aspects of the present disclosure, a process for controlling an industrial system comprises receiving commands and sample data from sensors. Further, parameters of a model of the industrial system are initialized. Disturbances within the industrial system, references, and a state of the industrial system are predicted. The process further comprises updating the model of the industrial system based on the predicted state, the predicted disturbances, and the predicted references and updating Jacobi and gradient matrices based on the updated model of the industrial system. The matrices are solved to create a solution update for an iteration step by the solution updater that also controls the Newton's iteration process by repeating the previous solution update process for certain times. A final solution based on the solution updates is transmitted to control the industrial system.

DETAILED DESCRIPTION

According to aspects of the present disclosure, an improvement in the field of industrial system control includes a device that provides values for control variables for the industrial system. Solutions provided herein provide the values for the control variables in ways differently than what was previously used. For example, the architecture of the devices provided herein has advancements over proportional-integral-differential (PID) control schemes, because the PID control schemes may not give optimal results. The devices disclosed herein may be used as hardware accelerators for controlling industrial systems.

Proper regulation of industrial system control variables, especially coordination of multiple control objectives, is very challenging in the process of system design. Traditionally, PID control schemes have been used to generate control actions for these dynamic systems in response to reference changes or disturbances in these systems. The control actions are determined based on the errors or deviations of the measured output variables from the reference commands based on the reference changes. Control responses are dependent on the HD gains selected, and the optimized gains for one operating condition may not be effective for another different operating condition.

Although traditional controllers such as PIDs may be able to control and regulate the multi-input, multi-output systems, they do not generally guarantee achieving optimal performance of these systems or guarantee satisfying multiple control objectives. Model predictive control (MPC) can fulfill needs for robust and effective control of highly complex and nonlinear systems. The MPC is an optimization-based control method that may coordinate multiple objectives while guaranteeing optimal system performance. An optimization problem formulation can generally start with defining the differential equations that govern the dynamics of the system, the control objectives which could be tracking a trajectory or limiting rate of change of inputs, and a prediction horizon that is derived from a model of the system. However, since the MPC is an optimization-based approach, its online operation is much more computationally expensive than traditional controllers. As a result, designing a real-time MPC, especially for the systems with fast transient behaviors, is quite challenging.

Although field programmable gate arrays (FPGAs) may run control algorithms much faster than most microprocessors through massive parallel processing, there are two main challenges in implementing a real-time model predictive controller (MPC) using FPGAs. First, programming an FPGA is more complicated than programming a microcontroller or DSP (digital signal processor), and as a result, implementation of optimization algorithms on FPGAs is very challenging. The second one is that, due to the low time constants of the dynamic systems, the control actions to the dynamic system must be updated in a very short period of time. For instance, the control sample time could be as low as tens of microseconds. Hence, designing the FPGA system architecture that could provide the optimal control decision within such short time intervals would demand rigorous design of FPGA-based hardware solver.

The solutions provided herein solve an optimization problem by applying the sequential quadratic programming method. The hardware accelerator can exploit the inherent parallelism in the algorithm finding the solution, offering efficient implementation of the solver.

Model Predictive Controller Apparatus

Figure 1:
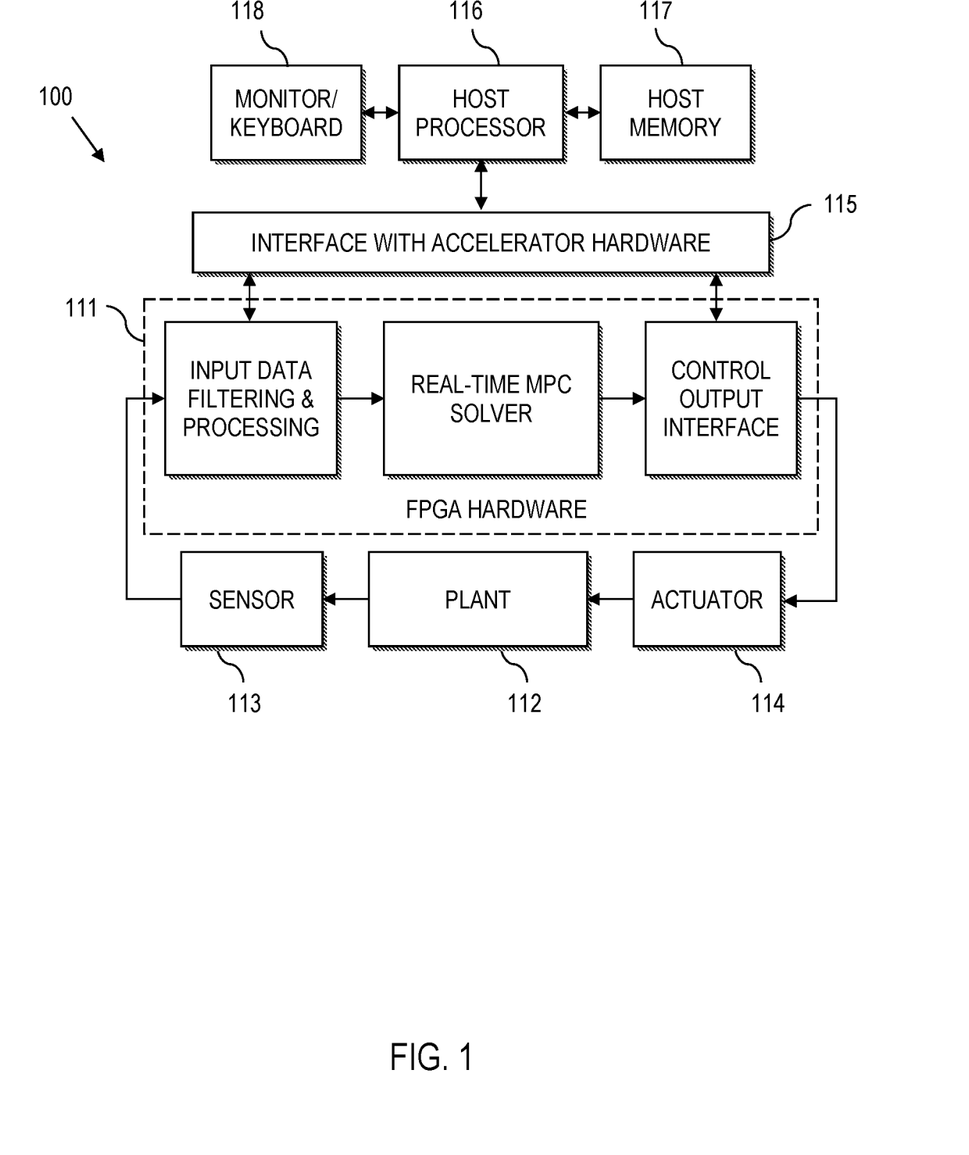
FIG. 1 is a schematic representation of the computing system including a host computer system and the present model predictive controller apparatus, according to various aspects of the present disclosure.

FIG. 1 is a simplified schematic representation of a computing system 100 including a host computer system and a model predictive controller apparatus 111, in accordance with an embodiment of the present principles. The purpose of this computing system is to generate control actions for a dynamic system or plant 112 in response to reference changes or disturbances in the system. Output signals from the plant 112 can be measured by a sensor 113 and sent to the model predictive controller apparatus 111, while a control action generated by the controller is applied to the plant through an actuator 114. The host computer system, which can be a DSP, CPU or other microprocessor system, consists at least of a host processor 116, a host memory 117, monitor/keyboard 118 and an interface 115 communicating with the accelerator hardware 111. Main components of the model predictive controller solver apparatus 111 include an input data sampling block, a real-time MPC computational solver that aims to find the solution of a nonlinear optimization problem, and a control action output interface. The real-time computational solver performs the solution search in an iterative manner.

In this preferred embodiment, the model predictive controller apparatus is realized on a reconfigurable integrated circuit called a field programmable gate array (FPGA). The parameters for the nonlinear QP (quadratic programming) solver are set up through the host computer system and real-time data are communicated via the communication interface 115. The results or solution values are sent back to the host computer through the same interface 115.

Method and Algorithm of Sequential Quadratic Programming

At each control sample time of an MPC, an optimization problem can be formulated and solved based on the current system conditions and new predicted states, where a cost function considering one or more objectives is minimized. The formulation of the optimization problem is discussed below.

Differential equations governing dynamics of the nonlinear system in a state-space form can be expressed as follows.

$$\dot{x}=f(x,u,t)$$

$$x \in R^n$$

$$u \in R^m \quad (1)$$

where x is a vector of system state variables and u is a vector of control variables, and n and m are the numbers of state variables and control variables, respectively. Using an appropriate control sample time, the state-space model can be discretized. A size of control sample time is subject to the time constant of system dynamics. The discretized state-space model is then used by the controller to predict the changes in the desired dependent variables caused by the changes in independent variables (e.g., input controls). An effect of disturbances or reference changes should be considered in the discretized state-space model as well. To decide values of the input control, a cost function should be defined and the objective for the optimization algorithm is to minimize $C(x,u)$ over $x \in R^n$, $u \in R^m$ subject to $h(x,u)=0$, $g(x,u) \leq 0$, (2)

where C(x, u) is a cost function for the system which could be the costs associated with the deviation of any state from a reference or a rate of change of any control action or state variable, or a combination, h(x, u) describes equality constraints that could be the discretized and linearized state-space model of the industrial process, and finally g(x, u) represents inequality constraints on the system, which could be the lower and upper bounds on any input control or state variables, or limitations on the rate of change.

The optimization algorithm starts with forming a nonlinear Lagrangian function, as given by the KKT (Karush-Kuhn-Tucker) conditions, in the following form.

$$\mathcal{L}(x,\lambda) = C(x,u) + \lambda^T(g(x,u)+z) \quad (3)$$

where vector $\lambda$ refers to Lagrangian multipliers, and inequality constraints are defined in form of equality constraints by introducing a vector of slack variables (i.e., z) as shown below.

$$g(x)+z=0$$

where $z \geq 0$ \quad (4)

Applying Newton's method to the nonlinear Lagrangian function, it is possible to generate an iterative process to find a solution of the resulting optimization problem as follows.

$$J(x^k,\lambda^k,z^k)d = -\psi(x^k,\lambda^k,z^k) \quad (5)$$

where J and $\psi$ are Jacobian and Gradient matrices respectively, and $d=(d_x,d_\lambda,d_z)$ represents the solution of equation (5, above) to be found at each iteration. Given a sufficiently close initial guess, through Newtonian iterative process, the solution is updated as shown below and can converge quadratically.

$$x^{K+1} = x^k + d_x$$

$$\lambda^{K-1} = \lambda^k + d_\lambda$$

$$z^{K-1} = z^k + d_z \quad (6)$$

At an end of each iterative optimization process, the optimal control action can then be found from the system solution, provided that it converges successfully or the preset time is out in real-time implementation.

Figure 2:
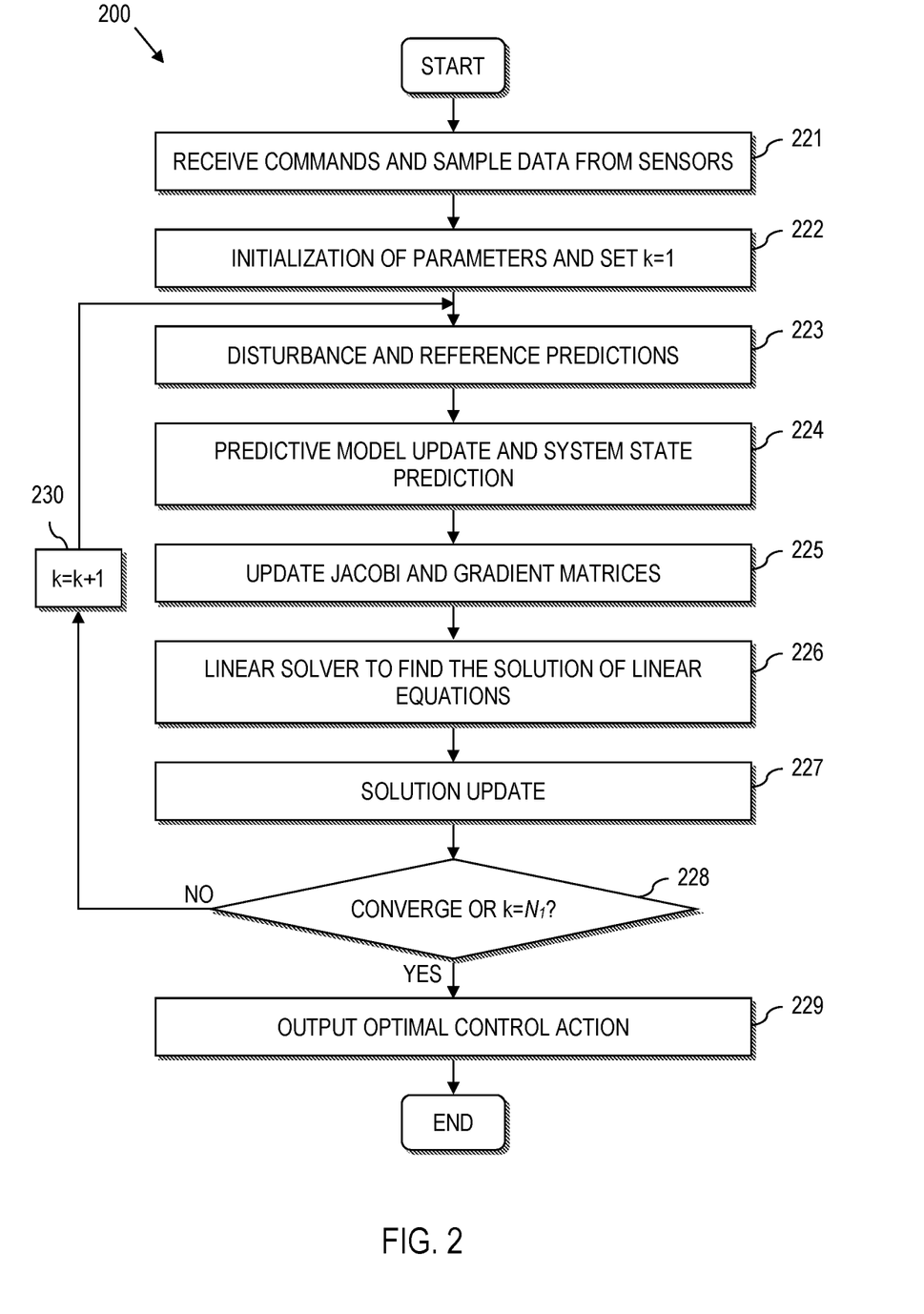
FIG. 2 is a flow chart illustrating a process for solving a nonlinear optimization problem, according to various aspects of the present disclosure.

FIG. 2 illustrates a flow chart 200 of the MPC algorithm using an interior point based quadratic programming approach to solve the nonlinear optimization problem.

After receiving the user commands from the host computer and measurement data from sensors in an appropriate data format 221, some parameters are initiated 222 and then the Newtonian iteration process starts (223-228). The QP (quadratic programming) problem is formulated and solved through a linear search along the solution vector, where piecewise linear model of the actual nonlinear plant and linear predictions of the model matrices are used. Each loop in this process includes five main computations: disturbance and reference predictions 223, predictive model update and system state prediction 224, updating Jacobi and gradient matrices 225, linear solver to find the solution of linear equations 226, and solution update 227. Based on a preset terminal criterion, a decision is made regarding if the iteration process stops 228. When the iteration process is terminated, the optimal control action will be output 229. Otherwise, a next iteration starts 230.

In the current control sample interval, a "tail" of the manipulated variable vector from the previous interval is used as an initial guess of the solution. This manipulated variable sequence is applied to the nonlinear model to predict system states, and the model is linearized around the manipulated variable and the state trajectories. This strategy is called "warm start", which can accelerate the convergence of the algorithm and is very important in the real-time implementation.

Real-Time Implementation of Model Predictive Controller on an FPGA

The model predictive controller (MPC) apparatus has the following features.

Predictive Model

The present model predictive controller apparatus is to search the optimal control action based on a real-time quadratic programming problem solver that solves a solution in parallel on the reconfigurable computing hardware, greatly accelerating the solution process. A salient feature is that the model can be dynamic or time-variant within the prediction horizon and may take different forms (e.g., physics-based, system identification-based, heuristics-based, or learning-based models).

This method linearizes the nonlinear or time-variant model at each control sampling instant. The system model is periodically linearized within a fixed prediction horizon (i.e., window) to produce a series of digital images or snapshots of the system (where the term "system" is used interchangeably with the term "plant"). The predictive model at one prediction step is used to predict the system states and update the linearized system model (around the new steady-state operation condition) at the next prediction step. Typically, these future state and input trajectories are obtained by simulating the nonlinear plant model Np time steps into the future (where Np is a design parameter and the number of prediction steps within one control sample interval), starting from the current step. In an approximate QP problem, the nonlinear plant model is replaced by the time-varying linear model which is an approximation of the original nonlinear model.

Equality constraints can be used to eliminate variables so that the resulting quadratic programming formulation has significantly fewer optimization variables. The successively linearized nonlinear plant model, the constraints on state and control variables and the quadratic cost function are incorporated to formulate a quadratic programming problem, which is then solved in real-time with the present quadratic programming solver.

State Estimation and Parameter Estimation

When some system states are not measurable or hard to measure, an estimation of the system states is needed at each sampling instant both to integrate the nonlinear model and to accomplish the local linearization. Two typical approaches are used for state estimation: Extended Kalman Filter (EKF) and Receding Horizon Estimation (RHE).

When systematic errors on the model parameters are present, an estimator may be affected by offsets in the values of the state estimates which degrades the prediction ability of the nonlinear model and can involve offsets in the controlled variables as well. Therefore, an estimation of model parameters is desirable to achieve better control performance. An iterative process can also be used to estimate the model parameters. Typically, the offline parameter estimates that are taken from the data sheets or from offline experiments can be used as an initial set of parameters and updated online.

MPC Solver Architecture

Figure 3:
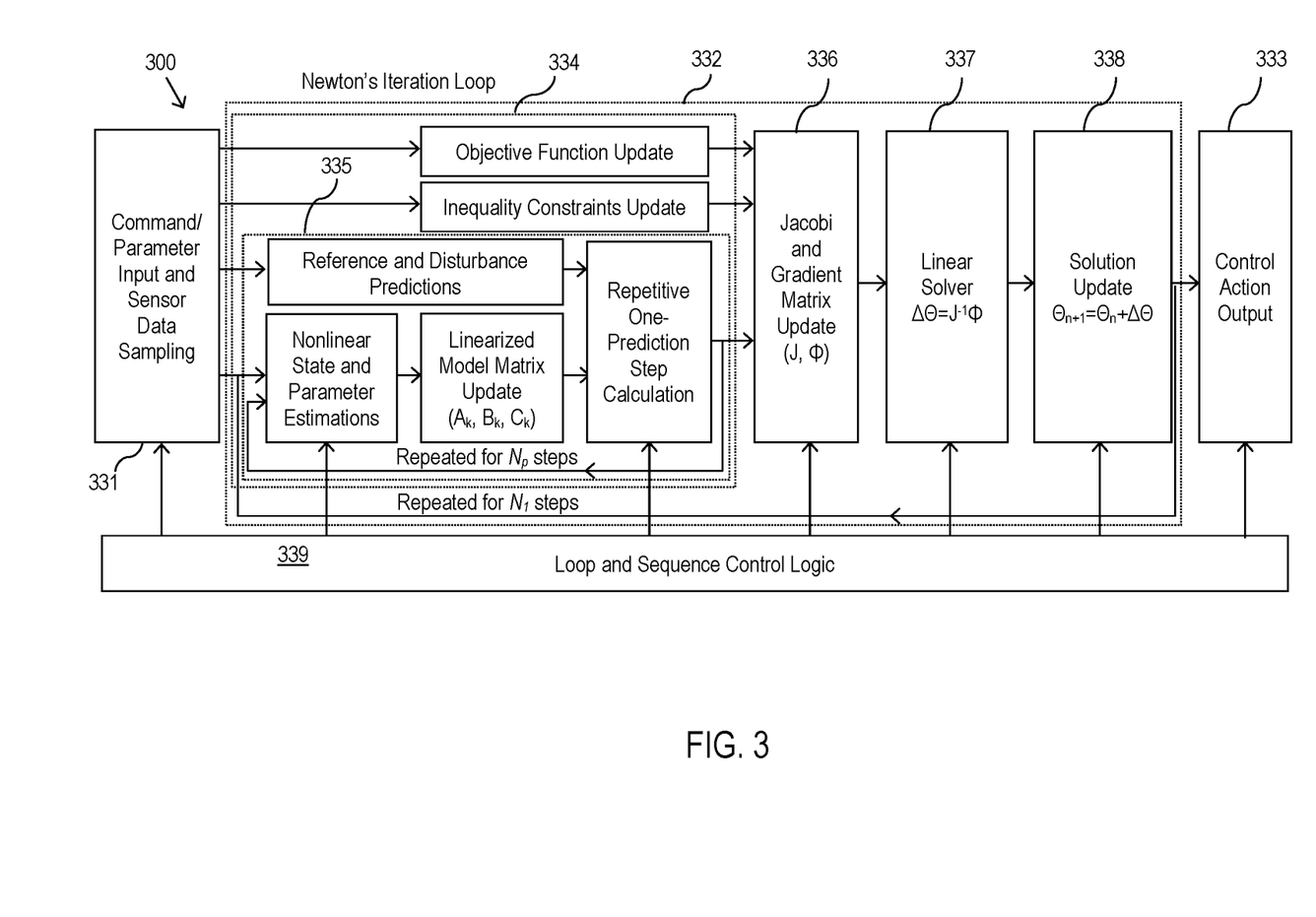
FIG. 3 is block diagram of a data flow in a present real-time model predictive controller running on reconfigurable hardware, according to various aspects of the present disclosure.

FIG. 3 illustrates the model predictive controller solver 300 architecture on an FPGA and the data flow throughout the time period of one control sample. At each control step, the output signals in the controlled system are measured and sent to the MPC solver. The MPC solver needs to perform certain computational steps to find the optimal control action, where some can be done in parallel. The first step is to perform command/parameter input and sensor data sampling 331 (i.e., input block). The core or most complicated part of the MPC solver is to solve the nonlinear optimization problem.

One iterative loop in the Newton's iteration process includes several steps. The first step is to preprocess the data (i.e., reference value predicter 334). Based on the user commands or higher-level control strategies, the reference values are predicted. Disturbances such as environmental changes of the industrial system where the present MPC works may also be predicted and included in the model prediction. If some states are not measurable or hard to measure, an estimation of the system states is performed. In addition, model parameters can also be estimated for inclusion in the predictive model. Based on the state and parameter estimations, the predictive model is then updated. The prediction model is then used to perform one-prediction-step calculation, considering the reference and disturbance predictions. This process is repeated for Np steps (where Np is the number of prediction steps within one control sample interval 335) before moving to the next block (i.e., matrix updater) 336. Furthermore, the cost function and inequality constraints are updated before data is sent to the next block 336. Secondly, the Jacobi and gradient matrices are updated accordingly, and then are sent to a linear solver 337. The linear solver 337 solves a system of linear equations to find the search direction and incremental step 337, based on the Jacobi and gradient matrices. After the linear solver completes the solution process, the control solution vector will be updated (i.e., solution updater) 338. Before termination, the algorithm will move back to the first step in the iterative loop. In this implementation, after a certain number of iterations ($N_1$, which is a design parameter that can be changed by the user), the iteration process will terminate, and the solution vector will be updated where the first control action will be output and applied to the plant (see output block) 333.

A "Loop and Sequence Control Logic" unit 339 is designed to generate control signals, including reset, enable and address signals, to manage the registers, switches, and memory blocks. The middle four blocks 332 are controlled to operate iteratively within loops, where each execution of the loop represents an iterative step in the Newton iteration procedure. Parallelism is exploited in each of the processing blocks.

Parallel Data Flow in Real-Time Implementation of Linear Solver

The most time-consuming component in the MPC is the linear solver that aims to find the search direction and step in the Newton's iteration process. The linear solver solves a set of linear equations by applying Gauss-Jordan Elimination to an augmented matrix in parallel on the reconfigurable hardware, which can greatly accelerate the solution process. The main components of the linear solver include parallel data processing modules, reusable memory blocks and flexible control logic units. Latency of this solver is really low through parallel processing, pipelining and flexible use of memory blocks.

Figure 4:
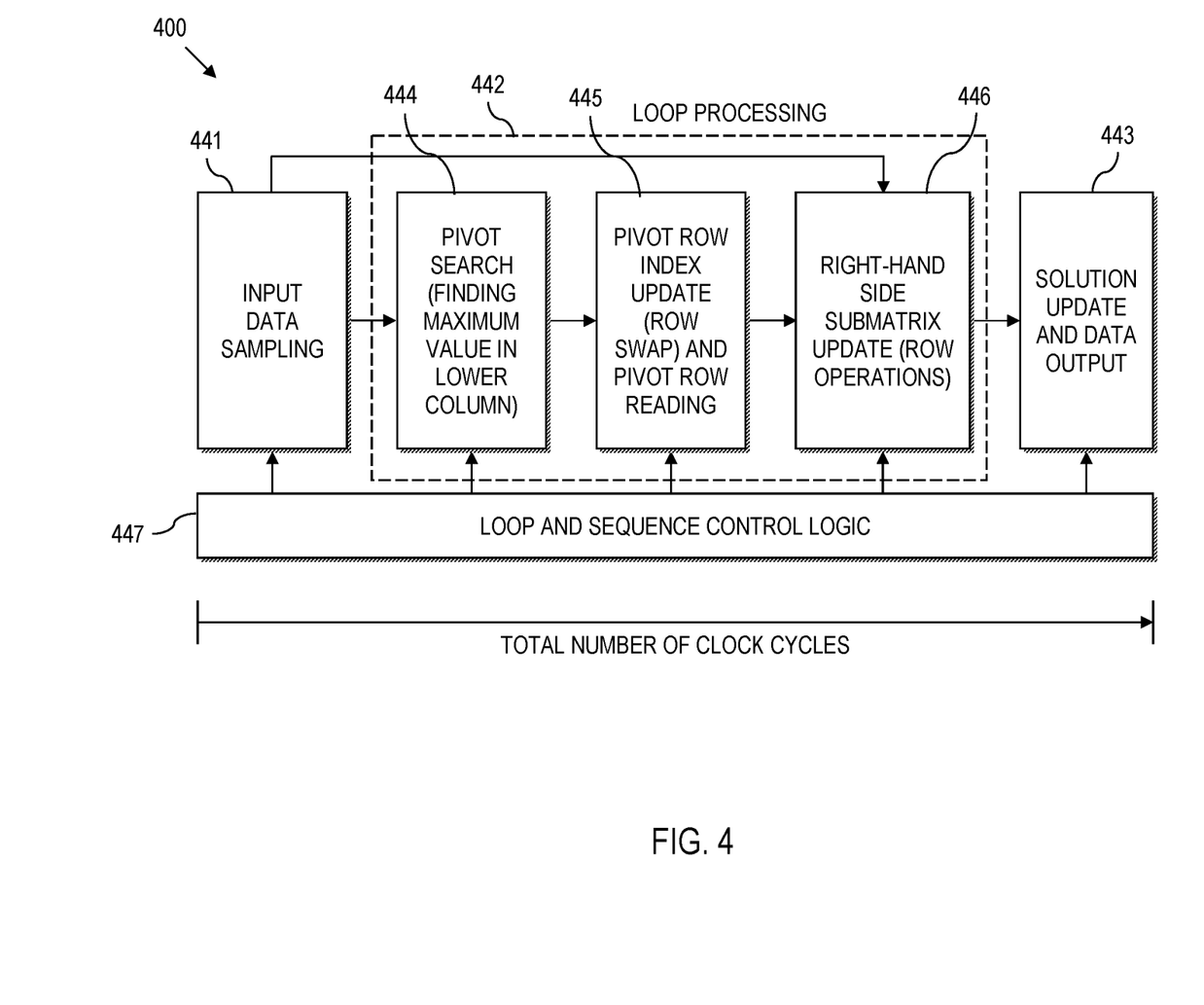
FIG. 4 is an illustration of a data flow in the present real-time linear solver running on reconfigurable hardware, according to various aspects of the present disclosure.

FIG. 4 is an illustration of the data flow in the present real-time computational solver running on reconfigurable hardware. The main data processing units on the linear solver apparatus 400 include an input data sampling block 441, a "Pivot Search" block 444, a "Pivot Row Index Update and Pivot Row Reading" block 445, a "Submatrix Update" block 446, and a solution update and data output block 443. A "Loop and Sequence Control Logic" unit 447 is designed to generate control signals, including reset, enable and address signals, to manage the registers, switches, and memory blocks. The middle three blocks 444, 445, 446 are controlled to operate iteratively within loops 442. Each iterative loop is to process one column in the Gauss-Jordan elimination procedure. Parallelism is exploited in each of the five processing blocks.

Parallelism

Figure 5:
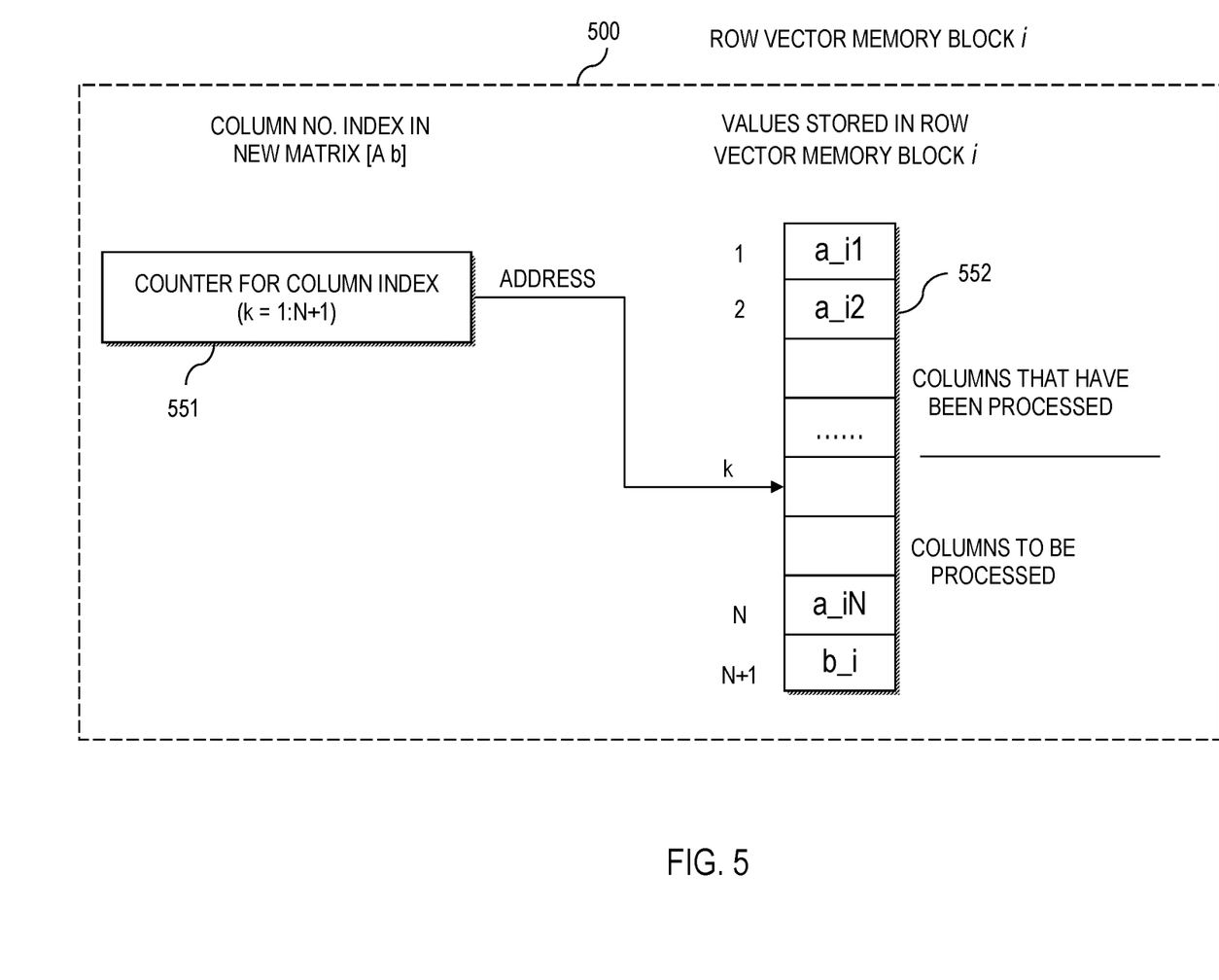
FIG. 5 illustrates the schematic diagram of memory management for input data in real-time implementation, according to various aspects of the present disclosure.

FIG. 5 illustrates a schematic diagram of memory management for input data in real-time implementation. A counter 551 is used to store the index of the value in a column. The value serves as the address to a memory block 552, which stores the values of a row vector.

The linear solver is constructed to handle the matrix operation row by row, which decouples the operation of different rows and allows parallel processing of multiple rows. Each row in the augmented matrix [A|b], represented by a vector 500, is stored in one individual BRAM (block random access memory) memory 552. A counter 551 is used to generate an address that points to a location of the value stored in the memory block, which is also a column index of the value in the original row. Using parallel memory modules, one for each row, allows for simultaneous access to all rows of the linear system as well as parallel execution of the Gauss-Jordan elimination procedure. To gain higher performance, a dual-port BRAM memory is chosen for each row or vector, because a single dual-port BRAM supports two simultaneous reading actions from two ports or one reading action and one writing action within one clock cycle. The two ports are separately controlled so that the values may be updated as needed by writing to one of the ports while the ports can be read at any time. After the values are updated they will be written back in the same block of memory from which they came. Data are read from output port B and written from input port A.

Figure 6:
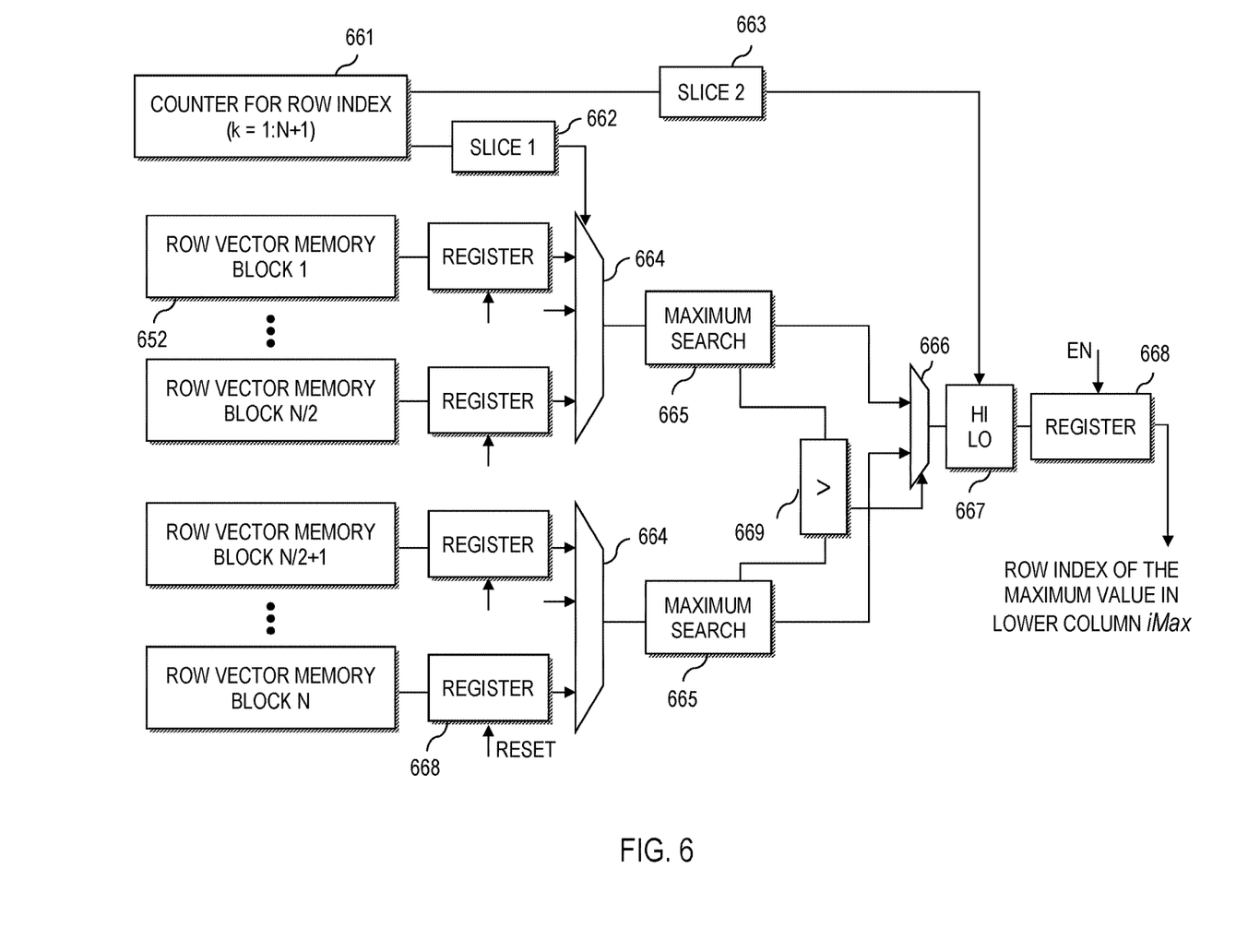
FIG. 6 illustrates the diagram of block for finding the maximum element in a column in real-time implementation, according to various aspects of the present disclosure.

FIG. 6 illustrates the diagram of block for finding the maximum element in a column in real-time implementation. The search process is divided into two groups (as an example in the preferred embodiment), and each group can be processed individually and in parallel. After the subgroup search is done, the reduced-tree logic will be used to decide the index of the maximum from the two groups. Depending on the need of parallel processing, the search process can be divided into any even number of groups (e.g., four or eight groups).

Switch

In a preferred embodiment as shown in FIG. 6, an N/2-port switch 664 is used to select a series of data (where N is the total number of data points to be processed and typically an even integer). The data are read from a memory block 652 and stored in registers. A counter 661 is used to generate the address for the switch 664 to sequentially select the values from the memory blocks 652. A slice block 662, which picks up the lower $\log 2(N)-1$ bits of the index value (in binary format), is used to generate the address for one of the switches 664. The selected data series is sent to a maximum search block 665 to select the maximum value and the index of the maximum value. A 2-port switch 666 is used to select the index of the final maximum value from the parallel blocks 665. A comparator 669 is used to control the switch 666. The index value (in binary format) from the maximum search block 665 will be combined with the output from another slice block 663, which picks up the highest bit of the index value (in binary format), through block 667. The combined value will be the final index of the maximum value in the entire search process and be stored in register 668.

Pipelining

The search process is performed sequentially. The series of data selected from the memory blocks are sent to a maximum search block 665. Pipelining is used to increase the throughput.

Figure 7A:
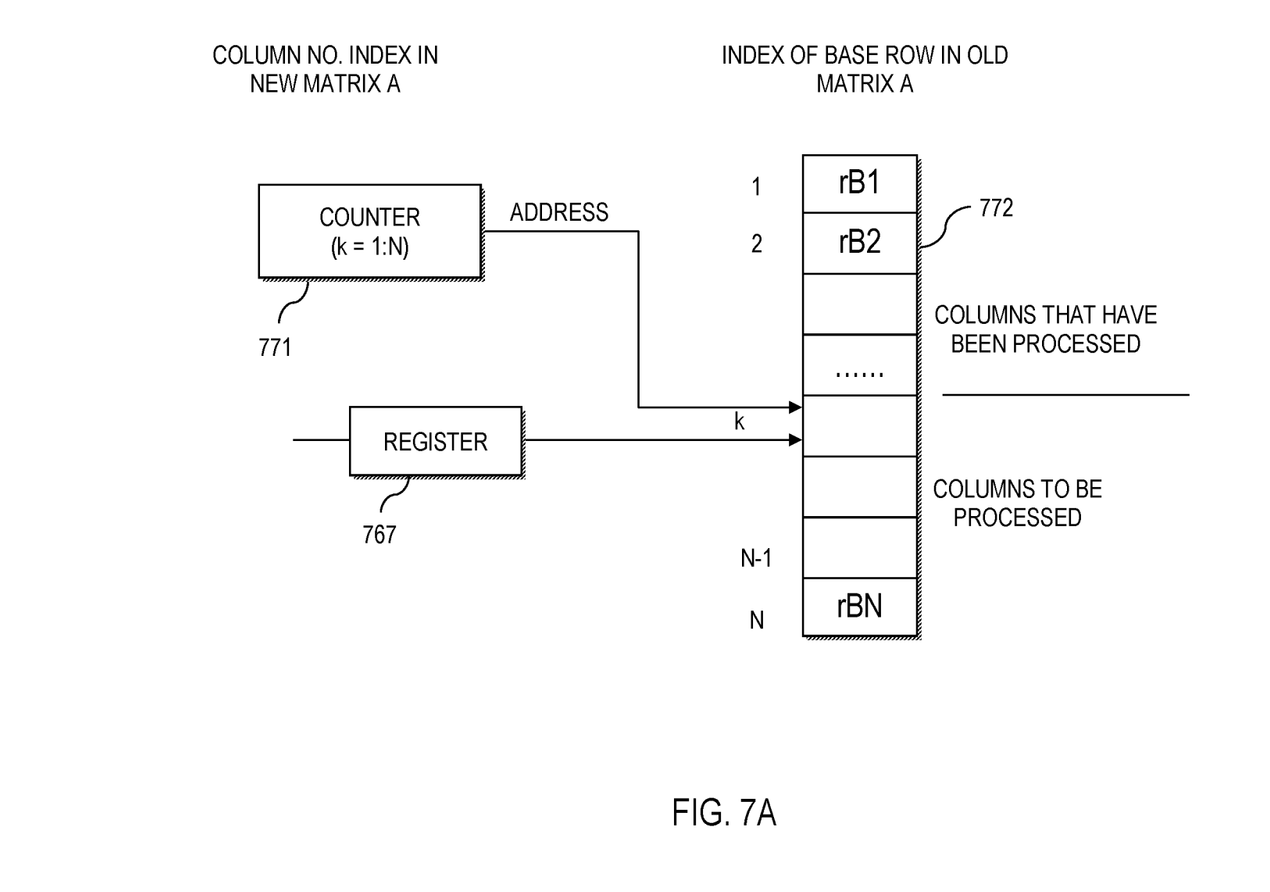
FIGS. 7A-B illustrate updating a base row index and reading a base row, according to various aspects of the present disclosure.
Figure 7B:
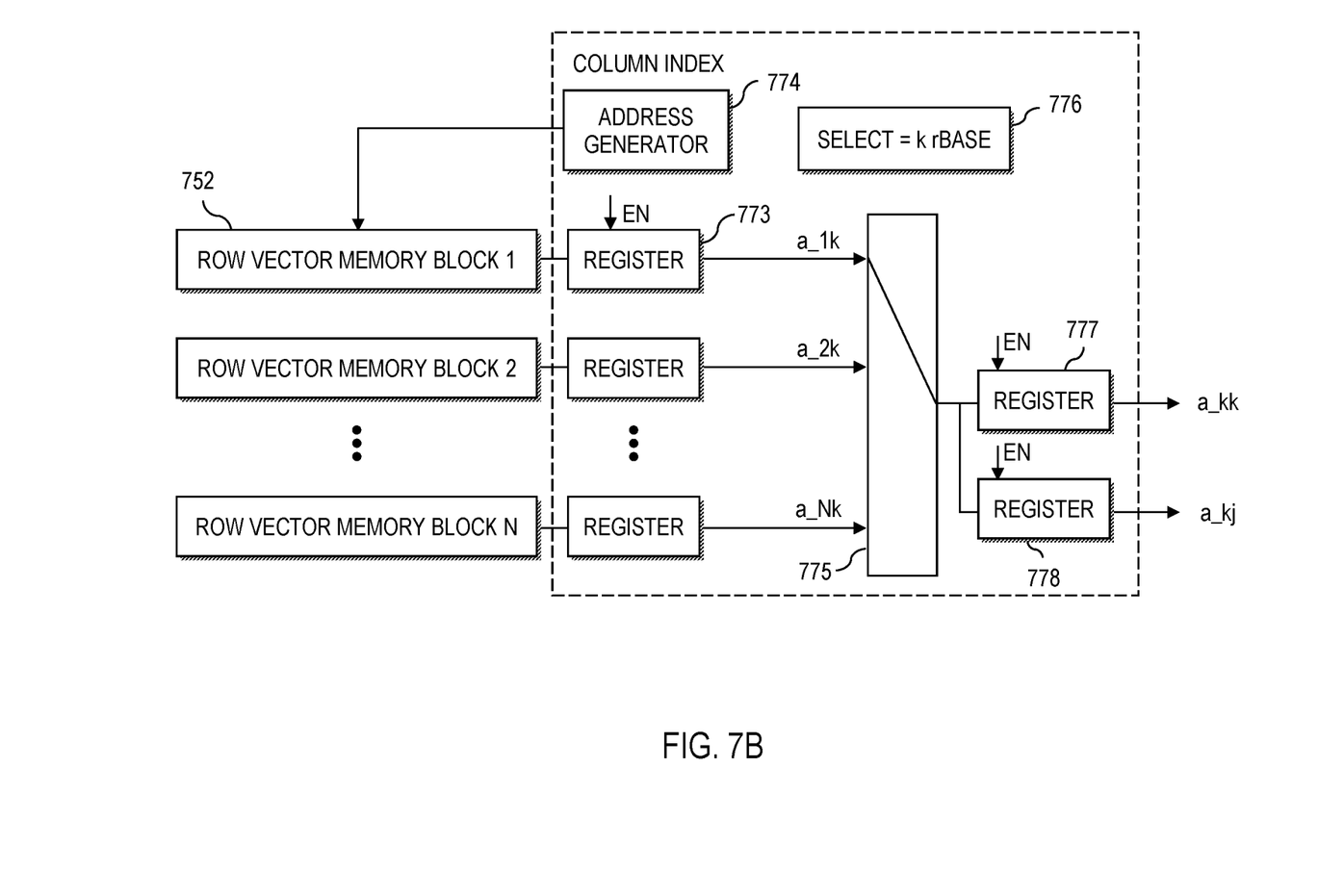

FIG. 7 illustrates the diagram for updating the base row index and reading the base row.

As shown in FIGS. 7A-B, a dedicated memory block 772 is used to store the index of the respective base rows in each iterative loop of the elimination procedure. During the operation of row exchange, updating the index of the base row vectors can logically change the rows, instead of physically moving the data from one memory block to another. This mechanism greatly reduces the latency. A counter 771 is used to generate the address to which the value of is stored in the memory block 752. The value of the row index of the maximum value in the lower column, iMax, is sampled by the register 767 before being written to the memory block 772.

When reading the values from the base row, the memory block 752 corresponding to the base row index is selected and the data values are read. The values are sent to the register 773 and sampled at a proper clock instant. An N-port switch 775 is used to select the elements from the base row. The N registers 773 are connected to the input ports of the N-port switch 775. The address 776 for the switch 775 is the index of the value stored in the memory block 772. The same set of switches will be used later. This is possible because the input ports of the switch are connected to the N memory blocks through externally-controlled registers 773. An address generator 774 is used to generate the column index to pick up the appropriate values in the memory block 752. When enabled, the address is incremented by one to select the remaining elements in the row after the pivot element. Two registers (777 and 778) are connected to the output of the N-port switch. The register 777 is used to sample and store the pivot element. The register 778 is used to sample and store the values of the remaining elements. Since this value will be sent to the following Gauss-Jordan Elimination block 780 for processing in a sequence, the value is also sampled sequentially.

Figure 8:
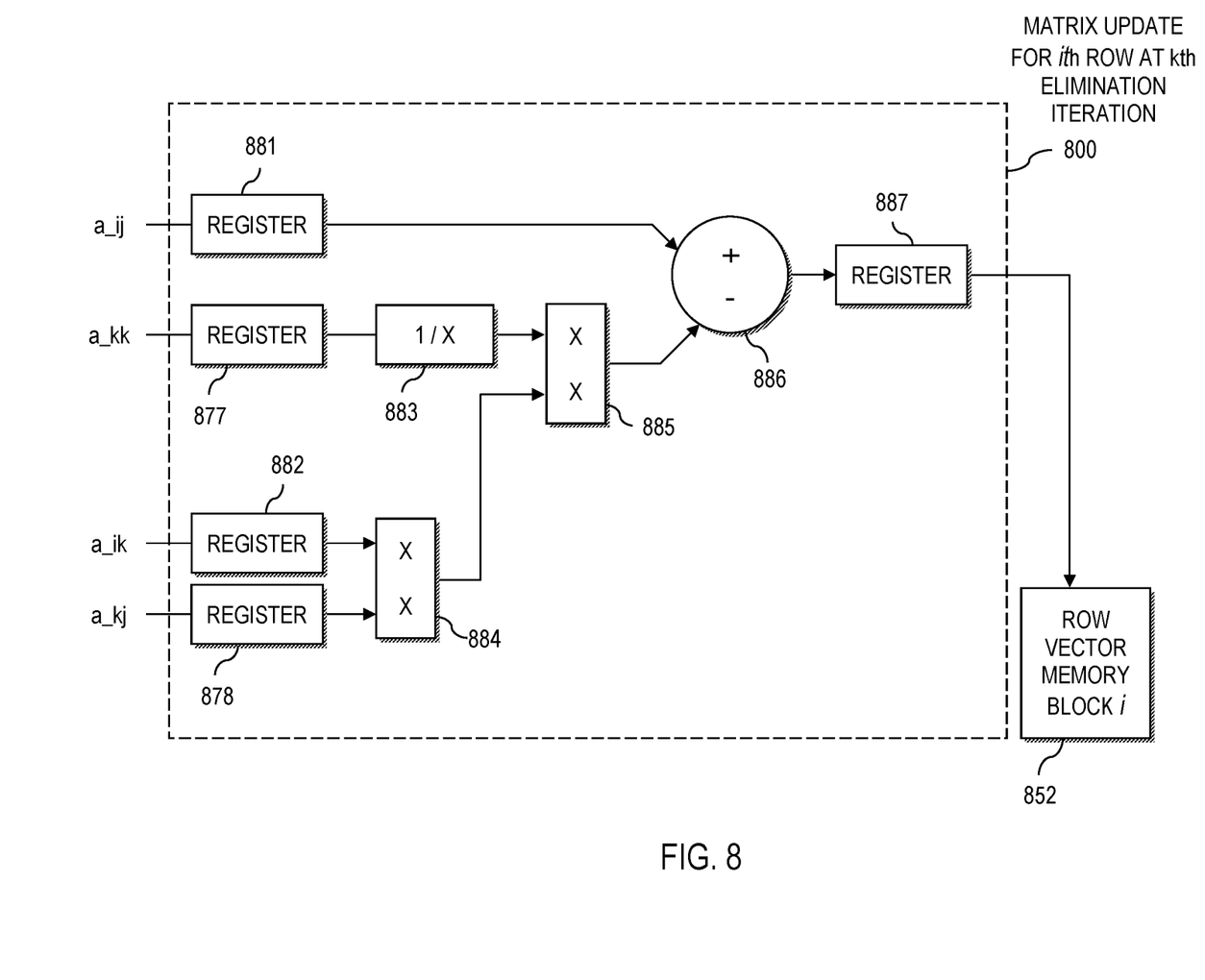
FIG. 8 illustrates a diagram of a Gauss-Jordan elimination block in real-time implementation, according to various aspects of the present disclosure.

FIG. 8 illustrates a diagram of a Gauss-Jordan elimination block 800 in real-time implementation.

Pipelining is applied to perform arithmetic described herein in a sequence. The registers and memory modules are controlled through the Enable signals so that the following arithmetic can be performed.

$$a_{ij}^{new} = a_{ij}^{old} - \left(\frac{a_{ik}^{new} * a_{kj}^{new}}{a_{kk}^{new}}\right)$$

In each row operation, four registers (877, 878, 881 and 882) are used to store the operands. The register 881 and the register 882 are sequentially sampled so that a vector of values is sent to the multiplier from each register. The output of the multiplier 884 is sent to the second multiplier 885. Another input to the multiplier 885 is the output from the reciprocal 883, which is connected to the register 877. The output from register 877 is the sampled value of the pivot element. The value sampled by the register 881 is connected to the first input of the subtract unit 86, while the output from the multiplier 885 is connected to the second input. The output from the subtract unit 886 is sent to a register 887 and then written back to the memory block 852.

Register and Memory Management

Figure 9:
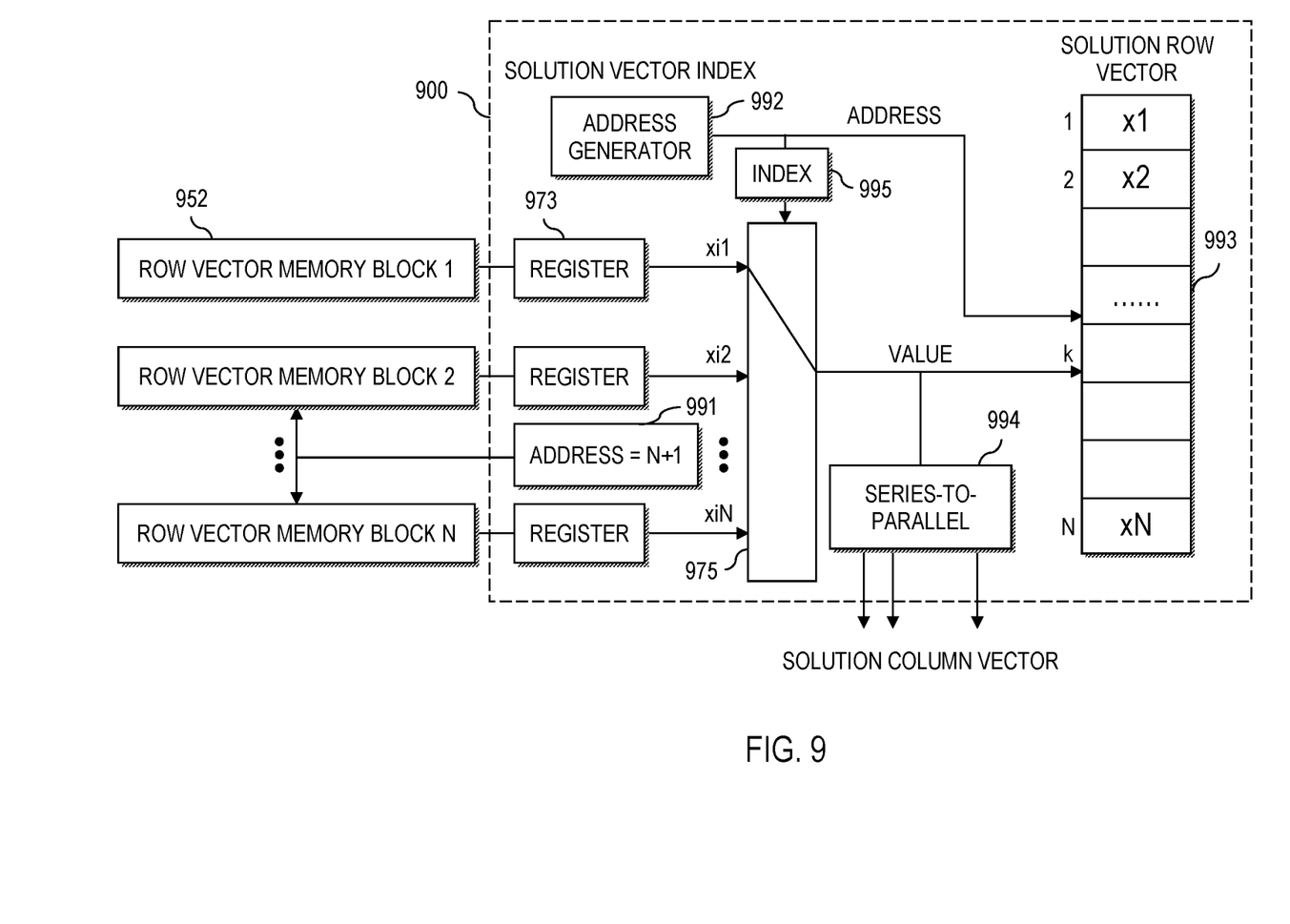
FIG. 9 illustrates a schematic diagram of memory management for output data in real-time implementation, according to aspects of the present disclosure.

FIG. 9 illustrates the schematic diagram 900 of memory management for output data in real-time implementation.

There are two types of output formats—parallel data output and series data output. A series-to-parallel block 994 is used to generate the parallel output data. A switch is used to select the data from the memory blocks and write into the solution vector memory block 993 in series. An index block 992 sends the column index to the solution vector memory block 993 for addressing.

Switch Reuse

The same switch 975 used for row vector reading is reused here to reduce resource consumption. The memory block 952 corresponding to the base row index is selected and the data values are read. The values are sent to the register 973 and sampled at a proper clock instant. The N-port switch 975 is used to select the elements from the corresponding row. The N registers 973 are connected to the input ports of the N-port switch 975. The address 995 for the switch 975 is the index of the value written to the solution memory block. An address generator 991, which has a value of N+1, meaning the last value in the row vector, is used to generate the column index to pick up the appropriate values in the memory block 952.

Timing of Control Logic

Figure 10:
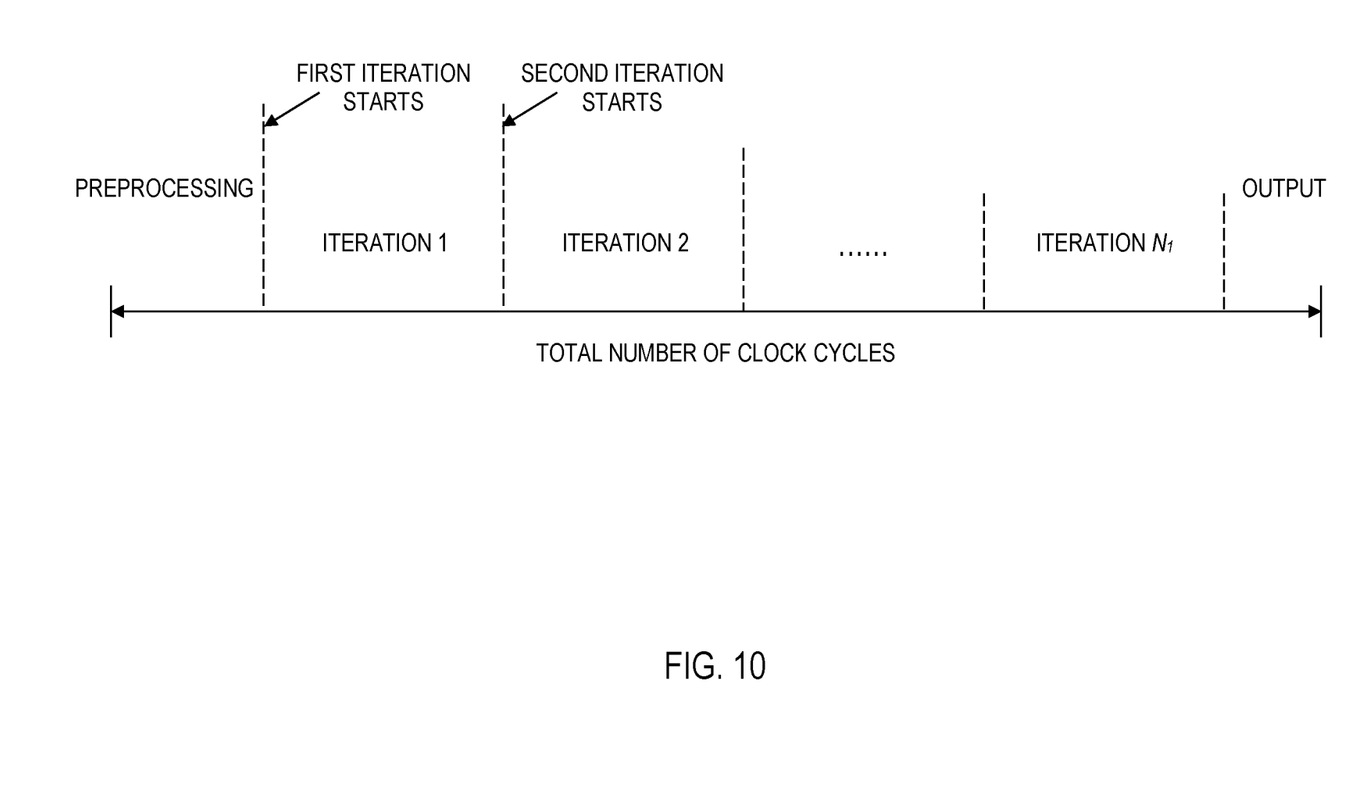
FIG. 10 illustrates a timing diagram (including parallelism and pipelining) for the loop and sequence control logic in real-time implementation, according to aspects of the present disclosure.

The control logic unit synchronizes all the processes by generating the required sequence of control signals for the loop and parallel processing units to execute the instruction in turn. FIG. 10 illustrates the timing diagram (including parallelism and pipelining) for the loop and sequence control logic in real-time implementation.

Scalability

The present method and apparatus can scale up to a different or larger nonlinear dynamic system by appropriate modifying the memory blocks, computing units and control logic, when there are different numbers of prediction horizon and control horizon and different numbers of input and output variables.

Process Flow Chart

Figure 11:
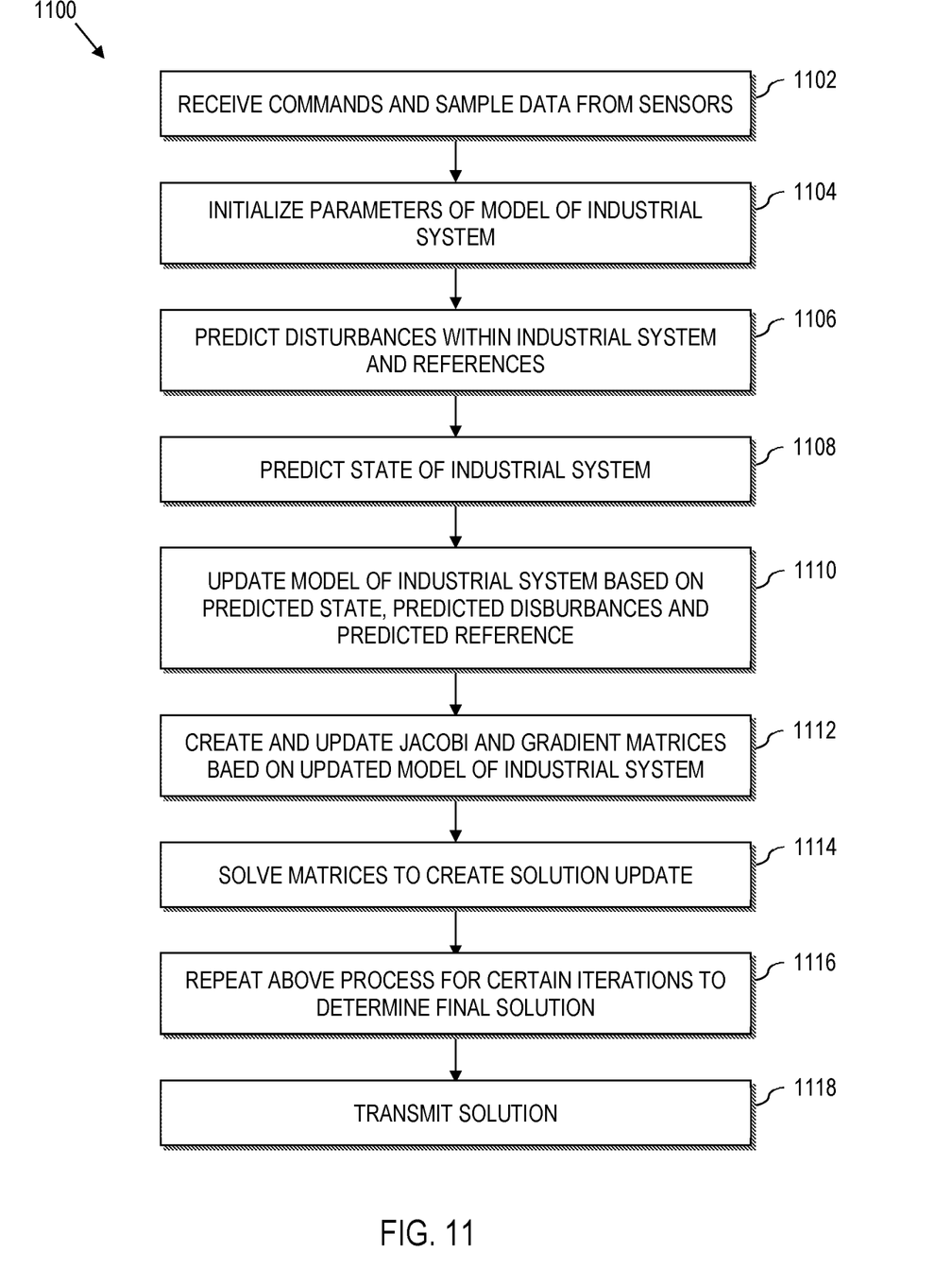
FIG. 11 is a flow chart of a process 1100 for controlling an industrial system, according to aspects of the present disclosure.

FIG. 11 is a flow chart of a process 1100 for controlling an industrial system according to aspects of the present disclosure. At 1102, commands are received from a user. Further, sample data are received from sensors. At 1104, the sample data and commands are used to initialize parameters of a model of the industrial system. At 1106, disturbances within the industrial system and reference changes within the industrial system are predicted. Using the predictions, the sample data, the commands, and the model of the industrial system, at 1108, a state of the industrial system is predicted. At 1110, the model of the industrial system based on the predicted state, the predicted disturbances, and the predicted references. At 1112, Jacobi and gradient matrices based on the updated model of the industrial system are created and updated. At 1114, the Jacobi and gradient matrices are solved using an FPGA, as discussed above, to create a solution update. At 1116, a final solution is determined by iterating through 1102 through 1114 until a predetermined number of iterations is reached. The final solution is transmitted to the industrial system at 1118.

Miscellaneous

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus (e.g., an FPGA), or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:
1. A device for controlling an industrial system, the device comprising:
an input block;
a reference value predictor coupled to the input block;
a matrix updater coupled to the reference value predictor;

a linear solver coupled to the matrix updater, the linear solver comprising:

a memory structure such that each row of Jacobian and gradient matrices may be processed in parallel;

a pivot search block that determines a maximum element in a column of the Jacobian and gradient matrices;

a pivot row reading block; and a submatrix update block;

a solution updater coupled to the linear solver; and an output block coupled to the solution updater.

2. The device of claim 1, wherein the pivot search block includes two engines such that two pivot search determinations are processed in parallel before reducing to one determination.

3. The device of claim 1, wherein the submatrix update block performs a Gauss-Jordan elimination procedure.

4. The device of claim 1, wherein the pivot search block, the pivot row reading block, and the submatrix update block process in parallel.

5. The device of claim 1, wherein the reference value predicter comprises:

a disturbance predicter that predicts disturbances in the industrial system;

a state predicter that predicts a state of the industrial system;

a model parameter predicter that predicts parameters for a model of the industrial system;

a model updater that updates the model of the industrial system based on the predicted state and the predicted parameters; and a one-prediction-step calculator that calculates a prediction step based on the predicted disturbances and the model of the industrial system.

6. The device of claim 5, wherein the one-prediction-step calculator feeds back to the state predicter such that a current iteration step affects future iteration steps.

7. The device of claim 1, wherein the matrix updater updates Jacobi and gradient matrices based on the iteration step.

8. The device of claim 1, wherein the solution updater updates a solution for an iteration step and controls a Newton's iteration process.

* * * * *